(No Model.)
E. H. WHITNEY.
LOCKING GEAR FOR WINDLASSES.
No. 344,023. Patented June 22, 1886.
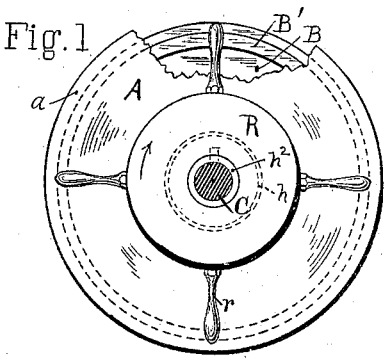
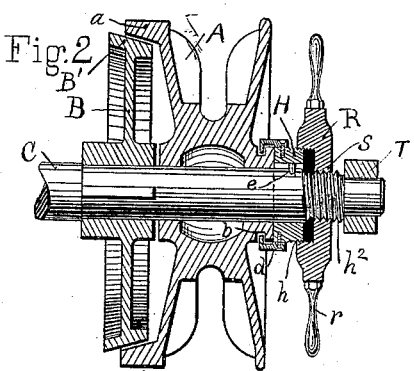
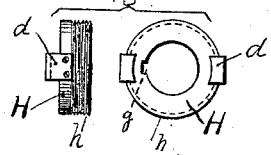
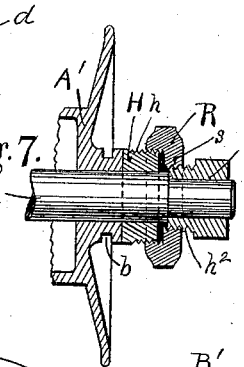
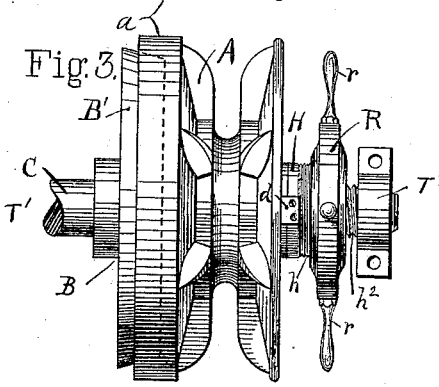
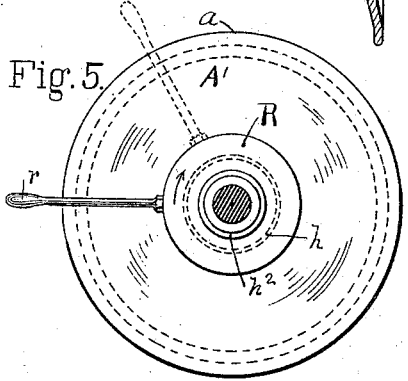
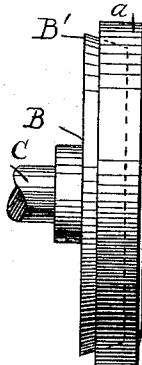
Witnesses.
Frank B. Grater
George L. Graham
Inventor.
Edwin H. Whitney

UNITED STATES PATENT OFFICE.

EDWIN HERBERT WHITNEY, OF PROVIDENCE, RHODE ISLAND, ASSIGNOR TO THE AMERICAN SHIP-WINDLASS COMPANY, OF SAME PLACE.

LOCKING-GEAR FOR WINDLASSES.

SPECIFICATION forming part of Letters Patent No. 344,023, dated June 22, 1886.

Application filed January 16, 1886. Serial No. 188,788. (No model.)

*To all whom it may concern:*

Be it known that I, EDWIN HERBERT WHITNEY, of Providence, in the county of Providence and State of Rhode Island, have invented a certain new and useful Improvement in the Construction of Locking-Gear for Windlasses, of which the following is a specification.

My invention relates to the construction of the means by which the loose drum or chain-wheel is locked to the revolving shaft and released therefrom; and it consists in the use of an operating-nut having within it two sections of screw-threads with differential pitch, which respectively engage with corresponding screw-threads upon the driving-shaft and upon the periphery of a metal ring fitted to slide freely upon the shaft. By the operation of a nut thus constructed much greater force can be exerted by an operator than by any means heretofore employed, and the screw-threads upon the respective parts can be made large and coarse, thereby insuring greater strength and less liability to wear than could be obtained by making the screw-threads fine enough to effect the same resulting power. The pressure of the ring upon one side of the hub of the drum forces it against the friction wheel or disk, when the nut is turned in the direction to advance it toward the drum, and in order to withdraw the drum from contact with the friction-wheel I attach one or more L-shaped pieces to the said ring in such position as to have the short arm of the L hook into an annular groove in the hub, and thus when the ring is moved in a direction away from the friction-wheel by the action of the nut the drum will, by means of the L-shaped hooks, be drawn away with it, and when released from contact with the friction-wheel it can revolve freely and independently of the ring and nut. In order to prevent the ring from turning on the shaft, I place a spline or pin upon it, which fits a groove within the ring, and will allow a movement only in a direction parallel to the axis of the shaft.

By the employment of a differential nut, as described, it will be found necessary, under all ordinary conditions, to use only short fixed handles to operate the nut, for an amount of power in excess of that needed to securely lock the drum and friction-wheel together can be readily obtained thereby.

In the drawings accompanying this specification, Figure 1 represents an end view of a differential nut and chain-wheel, with a portion of the wheel broken away to show one edge of the friction-disk. Fig. 2 is a central longitudinal sectional view of the friction and chain wheels, the differential nut, and the sliding ring and its connections with the hub of the chain-wheel. Fig. 3 is a top view of the same parts. Fig. 4 shows a top view of the sliding ring and a view of the end which bears against the hub of the chain-wheel when in position and the hook ends of the L-shaped pieces. Fig. 5 is an end view of a drum and a differential nut to force it against the friction-wheel. Fig. 6 is a side view of a loose drum of a windlass, the friction-wheel, differential nut, with a sliding ring and its connections with the drum, and a screw for one portion of the nut to engage with cut upon the bearing of one end of the shaft, instead of upon the shaft itself. Fig. 7 is a central longitudinal sectional view of one flange of the drum, the sliding ring, differential nut, and screw-threaded bearing at one end of the shaft.

Corresponding parts are indicated by the same letter in the several figures.

A is a chain wheel or drum; B, a friction wheel or disk keyed to the driving-shaft; B', the friction-surface of the same, which bears upon the inner side of the rim $a$ of the drum and locks it to the driving-shaft.

C is the driving-shaft; H, the sliding ring having screw-threads $h$ cut upon its periphery at one end; $d$, the L-shaped pieces which loosely connect the ring H with the hub of the drum by hooking into the annular groove $b$.

$e$ is a pin or spline upon the shaft which projects into the groove $g$ in the ring H and prevents its turning on the shaft.

R is a differential nut one portion of which has screw-threads which match the threads $h$ upon the ring H, and which are of less pitch than the threads $s$ upon the other portion of the nut, which match the threads $h^2$ upon the shaft.

The construction and relative position of the several parts are clearly shown in the sectional view, Fig. 2.

T is the bearing for one end of the shaft C.

T', Fig. 7, is the screw-threaded bearing with which the part $s$ of the nut R may engage instead of with a screw cut directly upon the shaft, as shown in Fig. 2.

The operation is as follows, namely: By turning the nut R in the direction indicated by the arrows, Figs. 1 and 5, it will move toward the friction-wheel B and through the ring H, force the drum A in the same direction, and against the friction-wheel B. At the same time the ring H, sliding freely upon the shaft, will be drawn away from the disk B by the action of the screw-threads within the nut R upon the threads $h$ on the periphery of the ring, so that the distance which the drum A will be caused to advance toward the disk B by one complete revolution of the nut R will be measured by the difference between the pitch of the screw-threads upon the shaft and the portion of the nut which engage them, and the pitch of the threads upon the ring H and the portion of the nut which engage them. The L-shaped pieces $d$, being secured to the ring H and hooked in the annular groove $b$ in the hub of the drum, draw it away from the friction-disk B when the ring is drawn away by the reverse action of the nut R, and at the same time the hooked ends of the L-pieces fit so loosely in the annular groove that the drum can revolve freely when it is unlocked from the friction-wheel without tending to cause the ring H to revolve with it.

By the use of the differential nut so great an excess of power above that needed to securely lock the drum and friction-disk together can be exerted by a single operator that the frictional surfaces of the drum and disk may be oiled, and thereby prevent the usual rapid wear and destruction of these parts.

I claim—

In a windlass, the combination of a drum or chain-wheel mounted loosely on the driving-shaft, a friction-disk, B, mounted rigidly thereon, both having plain adjacent friction-surfaces, and a differential nut, R, engaging with corresponding screw-threads upon the shaft and upon a sliding ring, H, respectively, which ring is loosely connected to the drum, whereby it is forced against or withdrawn from the disk B, substantially as described.

EDWIN HERBERT WHITNEY.

Witnesses:
FRANK B. GRATER,
HENRY B. ROSE.